(No Model.)

D. E. BARTON.
DRAFT EQUALIZING CULTIVATOR.

No. 465,421. Patented Dec. 15, 1891.

Witnesses.
J. Monteverde
Chas. B. Kendall

Inventor
Delbert E. Barton
By
M. A. Acker

United States Patent Office.

DELBERT E. BARTON, OF SAN FRANCISCO, CALIFORNIA.

DRAFT-EQUALIZING CULTIVATOR.

SPECIFICATION forming part of Letters Patent No. 465,421, dated December 15, 1891.

Application filed June 10, 1891. Serial No. 395,740. (No model.)

*To all whom it may concern:*

Be it known that I, DELBERT E. BARTON, a citizen of the United States, residing at San Francisco, in the county of San Francisco and State of California, have invented certain new and useful Improvements in Draft-Equalizers for Cultivators; and I do hereby declare the following to be a full, clear, and exact description of said invention, such as will enable others skilled in the art to which it most nearly appertains to make, use, and practice the same.

My invention has relation to certain new and useful improvements in equalizers for cultivators, harrows, or the like, which has for its object to obviate the undue strain exerted upon the cultivator by shifting of the beam laterally or compensating for liability of the cultivator moving from its direct line while cultivating hillsides or the like, thus relieving the horse of strain necessary to keep the cultivator in line.

Figure 1:
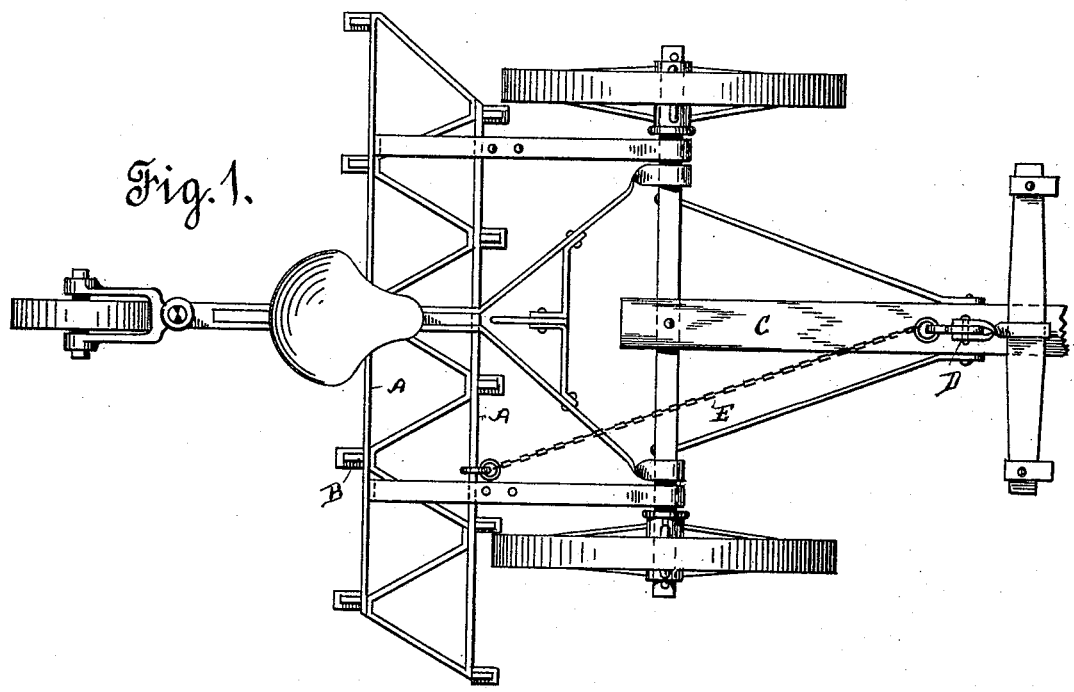
Figure 2:
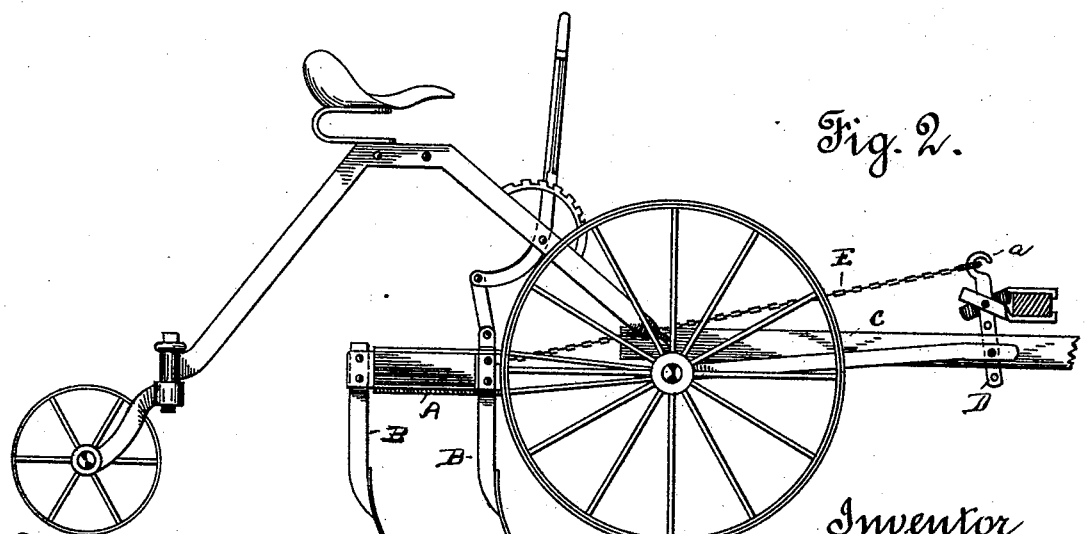

Referring to the drawings forming a part of this specification, wherein similar letters of reference denote corresponding parts, Figure 1 is a top plan of a cultivator, showing my improved draft-equalizer applied thereto; and Fig. 2, a longitudinal sectional view of Fig. 1.

The letter A indicates the beam of the cultivator, to which the teeth B are secured, and C the cultivator tongue or pole. To said tongue is pivotally secured the pivoted bolt or pin D, to which is attached the whiffletree. To said tongue is movably secured the equalizing-standard D, to which is attached the evener, having connected thereto the whiffletree. The upper end of said equalizer bolt or pin is turned so as to form the hook $a$.

Connection is made between the beam A and equalizer-bolt D by means of draft chain or rod E, which is movably secured to the beam and connected to the equalizer bolt or pin by means of its hooked end.

When the cultivator is used with equal number of teeth on each side of the center of the beam and upon level soil, the equalizing draft-chain is moved or secured to the center thereof, while when employed on hillsides equalizing draft-chain E is moved and secured to either side of the beam's center that happens to be uphill.

By the use of my draft-equalizer I am enabled to work the cultivator with a greater number of teeth to one side of the beam center than to the other and maintain the cultivator in direct line of travel by simply shifting the equalizer-chain to that end of the beam provided with the greater number of teeth. I am also enabled to shift the beam laterally so as to project to one side of the cultivator and by adjusting the equalizer-chain to correspond with the movement of the beam maintain the cultivator in direct line of travel. Thus it will be observed that the pulling strain of the cultivator is equally divided upon the horses.

Without the use of my equalizer-chain it is necessary that the animals pull away from the line of travel when cultivating hillsides or working with a greater number of teeth on one side than the other of the beam or when the beam projects laterally to one side.

Having thus described my invention, what I claim as new, and desire to secure protection in by Letters Patent of the United States, is—

In a cultivator or the like, the combination, with the beam thereof, of the movable draft-equalizer, said equalizer forming connection between the cultivator-beam and equalizing-standard and adapted to be shifted so as to compensate for undue strain on either side of the beam center, as and for the purpose set forth.

In testimony whereof I affix my signature in presence of two witnesses.

DELBERT E. BARTON.

Witnesses:
 N. A. ACKER,
 J. C. MCKEE.